Oct. 10, 1967 — I. G. RAUDSEP — 3,346,862
CORRELATION DETECTION SYSTEMS
Filed May 24, 1962 — 2 Sheets-Sheet 1

INVENTOR
Ilmar G. Raudsep

BY Arnold and Roylance
ATTORNEYS

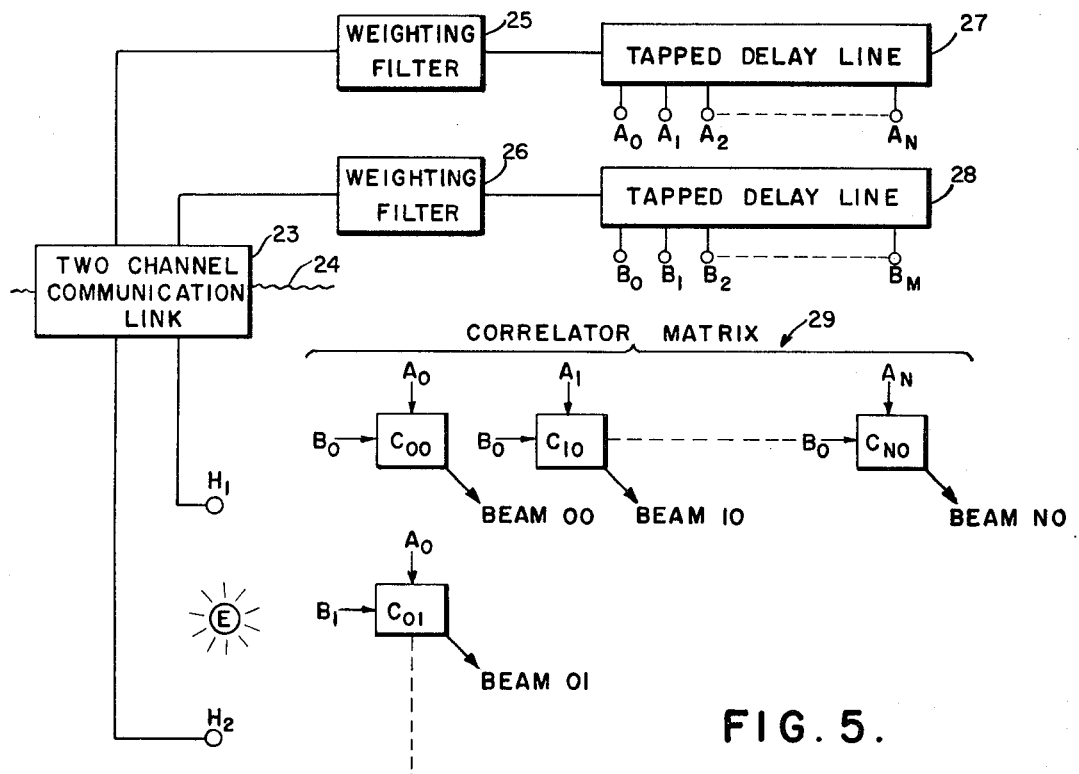
FIG. 5.
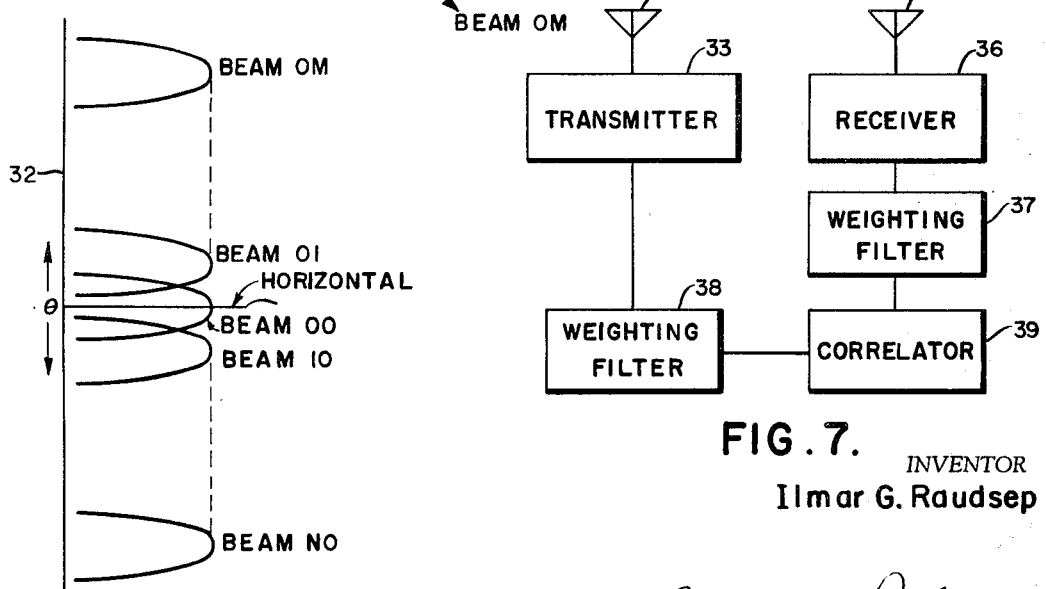
FIG. 6.
FIG. 7.
INVENTOR
Ilmar G. Raudsep
BY Arnold and Roylance
ATTORNEYS

3,346,862
CORRELATION DETECTION SYSTEMS
Ilmar G. Raudsep, Baltimore, Md., assignor to Martin-Marietta Corporation, Baltimore, Md., a corporation of Maryland
Filed May 24, 1962, Ser. No. 197,833
7 Claims. (Cl. 343—113)

This invention relates to correlation detection systems, more specifically to such systems exhibiting greatly increased accuracy in the determination of position parameters from the correlation process.

Correlation is a process for obtaining what may be called the average similarity between two functions or signals displaced relative to each other. In this application, we are interested in only a one dimensional displacement, a displacement in time. The product of the values of the two functions at each point in time is taken throughout an interval on the time axis chosen large enough to include both functions. These products are then added, and the sum divided by the time duration of the chosen interval. If the functions are different, the process is called cross-correlation. If two functions $f(x)$ and $g(x)$ have a time displacement $\tau$ and are correlated over a finite time interval $T_1$ to $T_2$, the cross-correlation process is described by:

$$\frac{1}{T_2-T_1}\int_{T_1}^{T_2} f(t)g(t-\tau)dt$$

If the two functions are identical, the process is called autocorrelation and is described by:

$$\frac{1}{T_2-T_1}\int_{T_1}^{T_2} f(t)f(t-\tau)dt$$

If $\tau$ is allowed to vary, and corresponding values of the autocorrelation integral are obtained for each value of $\tau$, the autocorrelation function is obtained:

$$\phi(\tau)=\frac{1}{T_2-T_1}\int_{T_1}^{T_2} f(t)f(t-\tau)dt$$

This function is properly defined with an infinite integration interval. In practice, the integration is performed over a finite interval, and if the interval is chosen sufficiently large, the result will approach the theoretical value of the function. For each time function $f(t)$, there exists a corresponding autocorrelation function.

If the autocorrelation operation is performed upon two identical functions whose time displacement is unknown, it is obvious that their time displacement $\tau$ may be obtained from a curve of the autocorrelation function by inserting the autocorrelation value and obtaining the corresponding value of $\tau$. This relationship permits the use of autocorrelation techniques in detection systems where position parameters, such as range and angle information, are normally obtained from measurements of the time difference between signals. In active echo or reflection systems, where a time comparison of the transmitted and received signals yields range information, such information may be obtained by correlation of the transmitted and received signals. In multi-receiver systems, whether active or passive, where angular position is determined by a measurement of the time difference of arrival of a signal at various receivers, correlation of the received signals may be used to obtain the same information. The great advantage of correlation techniques over other less sophisticated methods of time difference determination is that the comparison of a signal point by point against an identical signal in the correlation process provides an increased degree of discrimination against unwanted noise signals, resulting in a very high signal-to-noise ratio.

It will be obvious that in autocorrelation receiving systems, the nature of the autocorrelation function will be of prime importance. The autocorrelation function of more orderly time varying functions will have a peak for zero time displacement ($\tau=0$) and slope smoothly down on both sides of this peak toward a zero autocorrelation value. The received signals in a practical system, whether active or passive, are seldom orderly time varying functions and will seldom have such convenient autocorrelation functions. Their autocorrelation functions will normally have numerous side peaks extending away from the main peak on either side. These side peaks, while lower than the main peak, will nevertheless normally be of significant amplitude and will result in degradation of system performance as a result of ambiguity in the determination of the position parameters.

It is an object of this invention to provide a practical autocorrelation system having minimal or nonexistent side peaks in the autocorrelation function.

Correlation systems have been proposed whereby the transmitted signal is constrained to a function whose autocorrelation function has minimal minor or side peaks or none at all. Depending upon the nature and function of the system, the achievement of a transmitted signal of the required form is often difficult of attainment, it does not compensate for the effect of external noise appearing in the received signals, and it is, of course, not applicable to a passive system, where there is no transmitted signal.

It is therefore another object of this invention to provide a means for obtaining an autocorrelation function having minimal or nonexistent side lobes, which means is adapted for use with either an active or passive system using autocorrelation detection.

It is a further object of this invention to provide such a means which requires a minimum of additional equipment and may easily be incorporated in existing autocorrelation detection systems.

The objectives of the invention are achieved, briefly, by synthesis in the receiving system of the appropriate autocorrelation function. Each of the two signals to be correlated is pased through a filter which weights or attenuates various frequency components of the signal in such a manner that the autocorrelation function of each resulting signal at the input to the correlator has a narrow main peak and low side peaks.

The invention may be more readily understood by reference to the following detailed description taken in conjunction with the drawings, which form a part of this specification, and in which:

FIG. 5 is a functional block diagram of an embodiment of this invention in a steered beam underwater explosive echo detection system;

FIG. 6 is a diagram illustrating the relative angular positions of the beams appearing at the outputs of the correlators of the system of FIG. 5; and FIG. 7 is a functional block diagram of an embodiment of this invention in an active reflection system in which range information is obtained by correlation of the transmitted signal with the received signal.

Figure 1:
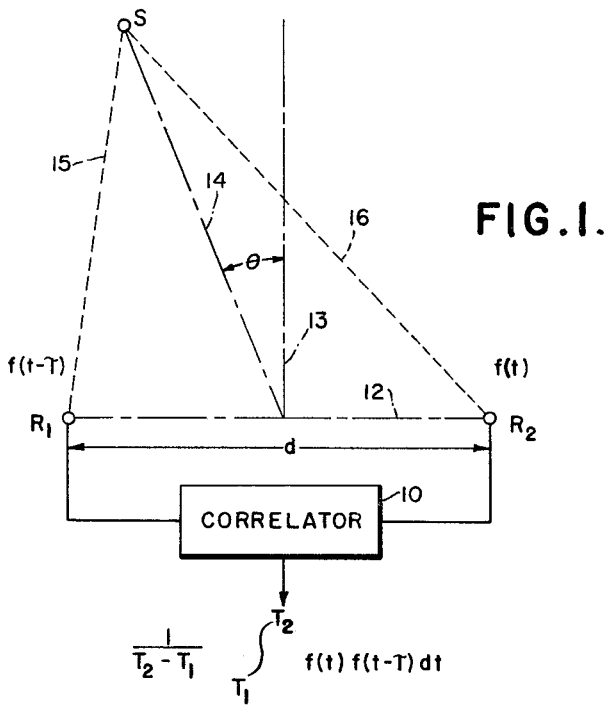
FIG. 1 is a functional block diagram of a simple autocorrelation receiving system using two receiving or detecting elements.

FIG. 1 shows a simple autocorrelation receiving system in which the angular position of the signal source S is determined by the difference in the time of arrival of the signal at two spaced receiving elements $R_1$ and $R_2$. This conventional system is described in order to illustrate the principles of operation of an autocorrelation receiving system and the nature of the problem created by the side peak configuration of the autocorrelation functions corresponding to practical received signals. Receiving elements $R_1$ and $R_2$, which may be antennas or any other type of detector, are spaced apart a distance $d$. The outputs of the receiving elements are connected to the inputs of correlator 10, which performs autocorrelation of the two input signals. The particular circuit configuration of the correlator is not important. It may be any of the conventional configurations well known in the electronics field for performing correlation of electrical signals.

A signal source S is located at some position spaced from receiving elements $R_1$ and $R_2$. Signal source S may comprise an external signal source, in the case of a passive system having no transmitted signal of its own, or, in an active system, it may represent the point from which the transmitted signal is reflected (target). The angular position of signal source S with respect to the receiving elements may be described in relation to line 12 (shown dashed) connecting the receiving elements and line 13 (dashed) comprising the perpendicular bisector of line 12. Dashed line 14, connected signal source S with the base of perpendicular bisector 13, makes an angle $\theta$ with the perpendicular bisector. The signal from source S travels to receiving element $R_1$ along the path indicated by dotted line 15, and to receiving element $R_2$ along the path indicated by dotted line 16. If the signal emanating from source S is describable in terms of a time function $f(t)$, then we may describe the signal arriving at receiving element $R_2$ as $f(t)$ and the signal arriving at receiving element $R_1$ as $f(t-\tau)$. Thus, the signal will arrive earlier at receiving element $R_1$ by a time $\tau$, which is a function of the velocity $v$ of the signal through the medium and of the geometry of the configuration:

$$\tau = \frac{d}{v} \sin \theta$$

The output of correlator 10 will then be the autocorrelation integral:

$$\frac{1}{T_2-T_1} \int_{T_1}^{T_2} f(t) f(t-\tau) dt$$

The amplitude of the output of correlator 10 will then depend upon the angle $\theta$ which source S makes with perpendicular bisector 13. For any angle $\theta$, the correlator output will have the value of the autocorrelation expression for the particular value of $\tau$ corresponding to angle $\theta$. If source S is moved in an arc about receiving elements $R_1$ and $R_2$, the angle $\theta$, and the corresponding time difference $\tau$, will vary continuously, and the output of correlator 10 will describe the autocorrelation function corresponding to the particular time varying function $f(t)$ emanating from source S. The amplitude of the system output as a function of the angular position of the source of the received signal comprises the beam pattern of the system, and since this angular sensitivity corresponds to the autocorrelation function of the received signal, the beam pattern of this system is defined by the autocorrelation function. The autocorrelation function defines the beam pattern in two dimensions, in a plane including the receiving elements. If the receiving elements have isotropic characteristics, the beam pattern in such a plane will be defined solely by the autocorrelation function, unmodified by any directional characteristics of the receiving elements. Since any directional characteristics possessed by the receiving elements will normally effect an improvement in the beam pattern for the particular application of the detection system, the configuration resulting from isotropic receiving elements may be treated as the worst case. For isotropic receiving elements, the beam pattern in any plane passing through the receiving elements will be identical, that is, the three-dimensional beam pattern will be generated by rotating the two-dimensional pattern defined by the autocorrelation function about the line connecting the receiving elements.

If the signals at the input to the correlator are defined by a relatively simple time varying function, such as the cosine squared function 17 in FIG. 2(a), then the corresponding autocorrelation function will have a convenient shape. The autocorrelation function corresponding to the cosine squared time function of FIG. 2(a) is shown as curve 18 in FIG. 2(b). This autocorrelation function has a single peak at the point of zero time displacement ($\tau=0$) and slopes smoothly down on either side of this peak to the abscissa, where the value of the autocorrelation integral equals zero. Since the autocorrelation function defines the beam pattern, the beam pattern of such a system for cosine squared input signals will have a main lobe and no side lobes. The absence of side lobes is of course a desirable beam pattern characteristic.

Figures 3, 4:
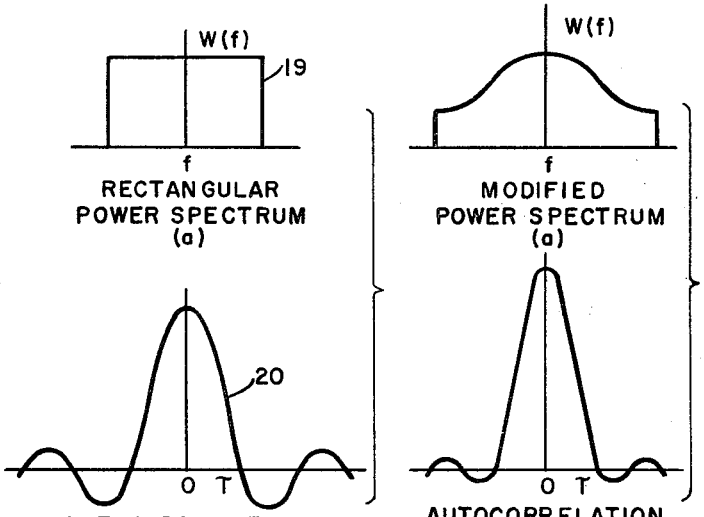
FIG. 3 shows a rectangular power spectrum and its corresponding autocorrelation function.
FIG. 4 shows a power spectrum modified in accordance with this invention and its corresponding autocorrelation function.

In a practical detection system, however, a received signal having such an ideal shape will seldom if ever be encountered. Turning now to FIG. 3, there is provided an illustration of the type of received signal likely to be encountered and the autocorrelation function or beam pattern resulting therefrom. FIG. 3(a) represents a signal at the input to the correlator which is not easily describable in terms of a time varying function, but which may be represented by its power spectral density function, or power spectrum. The signal has a power spectrum 19 corresponding to a band limited white noise signal extending throughout a frequency band centered at zero frequency. According to the well known Wiener-Khintchine Theorem, the power spectrum and the autocorrelation function are Fourier transform pairs. The autocorrelation function of a power spectrum may therefore be obtained by taking its inverse Fourier transform. The autocorrelation function 20 corresponding to the power spectrum of FIG. 3(a) is shown in FIG. 3(b), and has the form of a sine $x/x$ curve. The beam pattern will be the absolute value of the autocorrelation function. It will be seen that the beam pattern will have a main lobe and numerous side lobes extending away on either side of the main lobe, with the side lobe closest to the main lobe having an amplitude of 0.21 times the main lobe amplitude. The disadvantages of side lobes in beam patterns are obvious and well known; in the type of receiving system shown in FIG. 1, a beam pattern with high side lobes degrades system performance by causing ambiguous indications of angular position. A beam pattern having side lobes of troublesome amplitude is not the result solely of a signal input to the correlator having the precise configuration shown in FIG. 3(a), but will generally exist whenever the signals to be correlated do not have a rather well behaved time-varying function. This invention is directed to the problem of minimizing or removing these side lobes from the beam pattern of systems in which realistic received signals are encountered.

According to this invention, a beam pattern of the desired configuration is synthesized in the receiving system. Each received signal is weighted, or filtered, in the frequency domain prior to correlation so that the power spectrum of each signal appearing at the correlator input will have an inverse Fourier transform exhibiting the low side lobe and narrow main lobe characteristics desired of the system beam pattern. The inverse Fourier transform of the modified signal power spectrum is the synthesized beam pattern. Note that while the terms "main lobe" and "side lobe" are usually used with reference to beam patterns, for convenience they are used here also to describe the main peak and side peaks of a mathematical function, since the function forms the beam pattern of the system.

In performing this synthesis, the first step is to choose a power spectrum $W_O(f)$ whose inverse Fourier transform exhibits the desired beam pattern characteristics. If the received signal is describable in terms of its power spectrum $W_R(f)$, then a weighting function $W_W(f)$ is derived, satisfying the relation $W_R(f)W_W(f)=W_O(f)$. If all received signals are weighted or filtered in frequency according to the power weighting function $W_W(f)$, then the signals which are to be correlated will have the desired power spectrum $W_O(f)$. The nature and operation of this beam pattern synthesis may be more clearly understood by reference to the illustrative embodiment described below.

In FIG. 5, there is shown an embodiment of this invention in a sub-sea explosive echo detection system, employing the principles of multiple receiver autocorrelation detection discussed above in the description of the simple receiving system of FIG. 1. A pair of vertically displaced sub-sea hydrophones $H_1$ and $H_2$ are connected via two channel communication link 23 located on the surface 24 with electronic processing equipment comprising weighting filters 25 and 26, tapped delay lines 27 and 28 and correlator matrix 29. Hydrophones $H_1$ and $H_2$ correspond to receiving elements $R_1$ and $R_2$ of the system shown in FIG. 1; and the angular position of a target, such as a submarine, is discovered by exploding a charge E and determining the angular position of the resulting target echo by autocorrelation of the signals received at hydrophones $H_1$ and $H_2$ in accordance with the principles discussed in relation to the description of the system of FIG. 1.

In the system of FIG. 1, the outputs of the receiving elements were fed directly into the correlator, resulting in a single, fixed beam pattern having one main lobe. This system was therefore restricted to the detection of signals falling within that single lobe of the beam pattern. The main lobe of the beam pattern of the system of FIG. 1 was centered about the perpendicular bisector of the line connecting the two receiving elements. That would correspond in this system to a single horizontal beam located half way between the two hydrophones. The limited coverage obtainable with a single beam is obviously unsatisfactory for a practical detection system, and in the system of FIG. 5 a number of beams are obtained at various angles above and below the horizontal by introducing various amounts of time delay into the two channels by means of tapped delay lines 27 and 28, and by connecting appropriate pairs of taps on the delay lines each to a separate correlator in correlator matrix 29. The output of each correlator of matrix 29 comprises a separate and uniquely angled beam. The use of such a system to obtain a sequence of angularly displaced beams gives the appearance of electronically "steering" a single beam, and such systems are accordingly frequently called steered beam systems.

The operation of this system in providing the steered beams may be better understood by reference both to the diagram of FIG. 5 and to the diagrammatic representation of FIG. 6, showing the relative angular displacement of the resulting beams. Disregarding for a moment the function of weighting filters 25 and 26, the outputs of hydrophones $H_1$ and $H_2$ are fed through two channel communication link 23 directly into tapped delay lines 28 and 27, respectively. Delay lines 27 and 28 are each provided with a series of taps, $A_0$, $A_1$, . . ., $A_N$ and $B_0$, $B_1$, . . ., $B_M$, respectively. Taps $A_0$ and $B_0$ represent no delay with respect to the inputs of their respective delay lines. Each successive tap in each delay line represents an additional increment of delay with respect to the preceding tap.

Taps $A_0$ of delay line 27 and $B_0$ of delay line 28 are fed to the inputs of correlator $C_{00}$. Neglecting the delay incurred in communication link 23 and weighting filters 24 and 25, the signals received at hydrophones $H_1$ and $H_2$ are fed undelayed into correlator $C_{00}$, where autocorrelation of the signals is performed. This is directly analogous to the correlation in correlator 10 of the signals from receiving elements $R_1$ and $R_2$ in FIG. 1. $Beam_{00}$, which is the output of correlator $C_{00}$, corresponds to the beam pattern of the system of FIG. 1. $Beam_{00}$ will then have a horizontal main lobe positioned halfway between hydrophones $H_1$ and $H_2$.

To provide additional beams, angled up and down from $Beam_{00}$, various amounts of time delay are introduced by the delay lines into the channels of either of the hydrophones. The inputs to correlator $C_{01}$ are taken from tap $A_0$ of delay line 27 and tap $B_1$ of delay line 28. Since tap $B_1$ represents one increment of delay with respect to the input of delay line 28, $Beam_{01}$, the output of correlator $C_{01}$ is formed by autocorrelation of an undelayed signal from hydrophone $H_2$ and a signal from hydrophone $H_1$, which has been delayed for one increment of time. If the increment of delay from the input to delay line 28 to tap $B_1$ is $\tau'$, and if signal $f(t)$ is closer to hydrophone $H_1$ and arrives there before it arrives at hydrophone $H_2$ and $f(t+\tau'-\tau)$ represents the input from of correlator $C_{01}$ will be $$\frac{1}{T_2-T_1}\int_{T_1}^{T_2} f(t)f(t+\tau'-\tau)dt$$

where $f(t)$ represents the input to correlator $C_{01}$ from hydrophone $H_2$ and $f(t+\tau'-\tau)$ represents the input from hydrophone $H_1$. The maximum output of correlator $C_{01}$, corresponding to maximum coincidence in time of its input signals, will be obtained when $\tau'=\tau$. Since the maximum correlator output corresponds to the center of the main lobe of the beam pattern, it follows that $Beam_{01}$, which is the output of correlator $C_{01}$, will have a main lobe centered at an angle above the horizontal plane corresponding to a difference in time of reception at the hydrophones of $\tau'$. The time difference is related to the angle with respect to the horizontal plane by the expression $$\tau=\frac{d}{v}\sin\theta$$

and therefore the $Beam_{01}$ will have a main lobe angled up from the horizontal plane by an angle $\theta'$, where $$\theta'=\sin^{-1}\frac{\tau v}{d}$$

Therefore introduction of delay into the channel leading from the upper hydrophone $H_1$ results in a beam pattern inclined upwardly from the horizontal plane by the angle corresponding to the delay. By connecting tap $A_0$ of delay line 27, and successive taps $B_1$, $B_2$ . . . , $B_M$, representing increasing amounts of delay, to the inputs of correlators $C_{01}$, $C_{02}$, . . . $C_{0M}$, respectively, a succession of beams, $Beam_{01}$, $Beam_{02}$, . . . , $Beam_{0M}$ are obtained having increasing angles above the horizontal plane. Similarly, by connecting tap $B_0$ of delay line 28 and successive taps $A_1$, $A_2$, . . . , $A_N$, representing increasing amounts of delay in the channel corresponding to hydrophone $H_2$, to the inputs of correlators $C_{10}$, $C_{20}$, . . . , $C_{N0}$, respectively, a succession of beams, $Beam_{10}$, $Beam_{20}$, . . . , $Beam_{N0}$ are obtained having increasing angles below the horizontal plane. The closeness of coverage, that is, the angular spacing between the beams, is controlled by the value of the delay increment between successive taps. The angular coverage above the horizontal plane is governed by the number of the taps, as well as the delay increment value, of delay line 28, and the coverage below the horizontal plane by analogous characteristics of delay line 27. The main lobes of this beam array are shown in FIG. 6, arranged along a vertical line 32 representing angular displacement above and below line 33, representing the horizontal plane. All of the beams in the array exist simultaneously, and by monitoring the outputs of all of the correlators, an indication is obtained of the angular position of the target echo.

Turning now from the nature of the array of steered beams to the characteristics of the pattern of each individual beam and the angular discrimination afforded thereby, the function of the beam pattern is to discriminate against unwanted echoes outside of the angle of interest. Discrimination against noise returns is accomplished by the inherent characteristics of correlation detection. With the hydrophones appropriately spaced, so that at the lowest frequency of interest they are over half a wavelength apart, random noise signals arriving at hydrophones $H_1$ and $H_2$ will be different. This noise will be "averaged out" in the correlator. If the averaging period is long, the output will be zero. For shorter correlator averaging times, the output due to random noise will be a constant low voltage.

In an explosive echo detection system such as this, there will usually be one target, such as a submarine, whose echo it is desired to detect, and numerous reverberations, or echo returns from the bottom or the surface, which are unwanted, and from which the target echo must be discriminated. For this reason, it is desirable to have a beam pattern having a relatively narrow main lobe, and low or nonexistent side lobes, so that reverberations arriving from angles outside the angular area of interest will not be confused with a target echo which is within the main lobe of the beam pattern.

Figure 2:
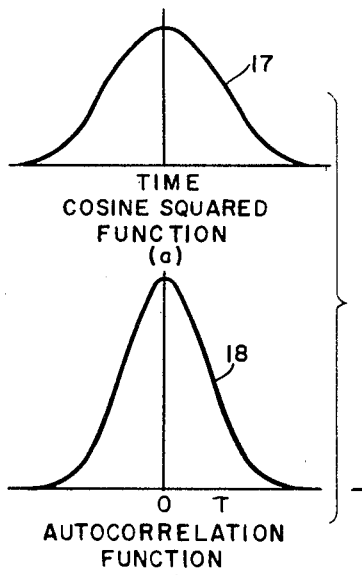
FIG. 2 shows a cosine squared time function and its corresponding autocorrelation function.

Unfortunately, an explosive echo does not provide a well behaved time-varying function with a convenient autocorrelation function, or beam pattern, such as that shown in FIG. 2($b$) for the cosine squared function of FIG. 2($a$). A more accurate approximation of the characteristics of the explosive echo signal is that of a bandlimited white noise signal, whose power spectrum is shown in FIG. 3($a$). As previously discussed, this power spectrum has an autocorrelation function (FIG. 3($b$)) having relatively high side lobes and hence unsuitable as a beam pattern.

The beam pattern provided by the autocorrelation function of FIG. 3($b$) is therefore replaced by a beam pattern synthesized in the detection system and having the desired characteristics. Since the explosive echoes received by the hydrophones are expressed as power spectra, it is convenient to discuss the synthesized beam pattern also in terms of power spectral density functions. A power spectrum $W_O(f)$ is chosen, whose inverse Fourier transform forms a beam pattern having the required narrow main lobe and low or nonexistent side lobes. Then, if the power spectrum of the received signals is represented by $W_R(f)$, a weighting function $W_W(f)$ is obtained such that $$W_R(f)W_W(f)=W_O(f)$$

Identical weighting filters 25 and 26 are then constructed having power response functions equal to $W_W(f)$. Filter 25 is placed in the system between hydrophone $H_2$ and delay line 27, and filter 26 between hydrophone $H_1$ and filter 28. The signal input to each filter will be the power spectrum $W_R(f)$, this will be modified in the filter by the filter power response $W_W(f)$, and the filter output will be the power function $W_O(f)$ having the desired autocorrelation function.

The exact nature of the power spectrum $W_O(f)$ which is chosen depends upon a number of factors, including the nature of the received signal, the permissible complexity of the filters, the nature and function of the system and the environment in which it is to be used. There is no "best" solution for the synthesized autocorrelation function. In general, the more desirable the beam pattern, and the lower the side lobes, the more difficult will be the synthesis. In making the autocorrelation function selection, normally a limiting value for the side lobes, or side peaks, is selected, based on a balance between system requirements on the one hand and the permissible difficulty and complexity of the filtering required on the other hand. An example of the configuration of a realizable power spectrum is shown in FIG. 4($a$), and its corresponding power spectrum, having side lobes 25 db down from the main lobe peak, is shown in FIG. 4($b$). Another example of an appropriate power spectrum is a Gaussian curve, whose Fourier transform is identical, that is, its autocorrelation function is identical to its power spectrum and has a single main lobe and no side lobes. For a discusion of the mathematics involved in this synthesis of appropriately shaped Fourier transform pairs, reference may be had to T. T. Taylor, "Design of Line Source Antennas for Narrow Beamwidth and Low Side Lobes," Institute of Radio Engineers Transactions on Antennas and Propagation, volume AP-3, No. 1, pp. 16-28, January 1955.

In the explosive echo system of FIG. 5, it may turn out that the power spectrum of the target echo differs appreciably from that of a reverberation return, and the problem exists as to which received signal, the target echo or the reverberation return, is to be used in the synthesis to form the desired beam pattern. Since, in a system of this nature, there will usually be only one target of interest at a given time, the discrimination against returns outside the area of interest which is provided by low side lobes is needed, not against other target returns, but against reverberation signals. Therefore, in such a situation, the power spectrum corresponding to the reverberation signals should be used in obtaining the synthesized beam pattern. The beam pattern formed by correlation of the reverberation signals will then have low side lobes and any such signals appearing at an angle outside the main lobe will be successfully discriminated against.

The invention may be embodied in directional autocorrelation receiving systems other than those of the precise configuration of FIG. 5. The invention would function similarly if incorporated in a directional detection system which is similar to that of FIG. 5 but which is not an acoustic, sub-sea system, and in which the transmitted pulse is a radio or radar pulse instead of an exploded charge. Since the invention depends for its operation only on knowledge of the nature of the received signals, and not on modification of the signals prior to reception, it will operate equally well in a passive system. The acoustic system of FIG. 5, for instance, without the explosive charge, could be used as a passive sub-sea monitor to pick up reverberations from any source of underwater noise, or could be used to plot underwater ambient noise or sea noise. In any case, all that is needed is an approximation of the characteristics of the expected received signals which is sufficiently accurate to permit the synthesis of a beam pattern acceptable for the intended use of the system.

The invention is not restricted to directional receiving systems having only two receiving elements, or to systems utilizing a steered beam to obtain broad angular coverage. More than two receiving elements may be used, in fact the use of more than two elements in an echo detection system similar to that of FIG. 5 would enable range information, as well as angular position, to be obtained through triangulation of the beams corresponding to different pairs of receiving elements. The only requirement for incorporation of this invention in a directional receiving system is that the signals received at the receiving elements be correlated.

The invention may be utilized in a detection system having only one receiving element, where the transmitted pulse and the received signal are correlated and the insertion of the correlation integral into the correlation function gives the corresponding valve of $\tau$, or time delay, from which range information may be derived. In such a system, the correlation function does not define the beam pattern, but side peaks in the correlation function will result in ambiguous range determinations and are therefore undesirable.

The block diagram of FIG. 7 represents a radar system incorporating this invention. A pulse is transmitted from transmitter 33 via transmitting antenna 34 and the reflection of the transmitted pulse from the target is picked up by receiving antenna 35 and fed to receiver 36. The received pulse is fed through weighting filter 37 to the input of correlator 39, and a sample of the transmitted pulse is taken from transmitter 33 and fed through weighting filter 38 to the input of correlator 39. The received signal and the sample of the transmitted pulse are correlated, and the range of the target is obtained from the time differential between the transmitted and received pulses, which is found by referring the particular value of the correlation integral to the correlation function.

It is important that the correlation function have low side peaks, and since it is improbable that the characteristics of the transmitted and received pulses are such that their correlation will produce the desired function, filtering or weighting is accomplished by inserting filters 37 and 38 in series with the inputs to correlator 39 from receiver 36 and transmitter 33, respectively.

The received signal will have been modified to some extent by noise and the nature of the reflecting surface, so that it will differ somewhat from the transmitted pulse. Thus the correlation process performed by correlator 39 may not be autocorrelation, which requires both correlated signals to be identical, but rather cross-correlation, where they are different. In any event, the mathematical operation being performed by the correlator is the same. The cross-correlation function bears the same relationship to the product of the two dissimilar spectra that the autocorrelation function bears to the power spectrum. That is, the cross-correlation function is the inverse Fourier transform of the product of the frequency spectrum of the transmitted signal and the frequency spectrum of the received signal. To synthesize a cross-correlation function, a product spectrum is chosen whose inverse Fourier transform has the required low side peaks. The frequency functions or frequency spectra (not the power spectra) of the transmitted and received signals are then modified so that the resulting modified frequency spectra give the chosen product spectrum.

Let the power spectra of the transmitted and received signals be $W_T(f)$ and $W_R(f)$, respectively, and their respective corresponding frequency spectra be $G_T(f)$ and $G_R(f)$. Select a product spectrum $W_O(f)$ having the desired inverse Fourier transform (cross-correlation function), with $W_O(f)$ being a product of frequency spectra $G_R'(f)$ and $G_T'(f)$. It is then desired to shape the frequency spectra $G_T(f)$ and $G_R(f)$ so that they become, at the input to correlator 39, the frequency spectra $G_T'(f)$ and $G_R'(f)$. Two frequency response functions, or frequency weighting functions, $G_{WT}(f)$ and $G_{WR}(f)$ are derived, satisfying the relationships $$G_T(f)G_{WT}(f)=G_T'(f)$$

and $$G_R(f)G_{WR}(f)=G_R'(f)$$

Filter 37 is constructed with a frequency response $G_{WR}(f)$ and filter 38 with a frequency response $G_{WT}(f)$. The signal inputs to correlator 39, after filtering, will then have frequency spectra $G_T'(f)$ and $G_R'(f)$, resulting in the desired cross-correlation function.

If the characteristics of the received signal are sufficiently similar to those of the transmitted signal, an adequate correlation function, depending upon system requirements, may be synthesized by treating the two signals as identical and synthesizing their corresponding autocorrelation functions in a manner identical to that described above in connection with the system of FIG. 5. In such a case, filters 37 and 38 would be constructed similarly to filters 25 and 26 of FIG. 5.

While the signals received in a practical detection system are normally most conveniently expressed as a power spectrum, and the necessary filtering functions expressed in terms of the power spectrum or the corresponding frequency spectrum, the invention may also be used where the signals are expressed as time-varying functions. It is possible for a received signal to be expressed as a rather complex time function, whose autocorrelation function, unlike that of the well-behaved cosine squared function shown in FIG. 2, has relatively high side lobes. In such a case, a desirable autocorrelation function may be synthesized, using the method of this invention, by choosing a time function having an autocorrelation function with the desired characteristics, and then modifying the received signal time function so that it assumes the configuration of the chosen time function. The invention contemplates the choosing of a correlation function having a desired configuration and the appropriate modification of the signals to be correlated, however they may be expressed, to give the chosen correlation function.

It is to be understood that in practical detection systems, the characteristics of a signal impinging upon the receiving element or elements will be modified not only by the filters, but by the characteristics of the receiving elements themselves, delay lines such as shown in FIG. 5, and other electronic system components such as amplifiers, heterodyning units and the like, which, although not shown in the block diagrams herein, form a part of most detection systems. The modification of the signal by these other system components must of course be taken into consideration in the correlation function synthesis. If the received signal characteristics used in the synthesis are those of the signal as it impinges on the receiving element or elements, then the expression describing the necessary modification of the received signal, which is derived in the synthesis process, will include the modification to the signal effected by all of these other components in addition to the shaping filters. If the signal modification by these other components is significant, the filter response characteristics will differ from the derived expression sufficiently to compensate for the effect of these other elements. If, on the other hand, the received signal characteristics used are those of the signal as it would appear at the correlator after having passed through all of the other system components, the effect of these other components will have already been taken into consideration and the filters may be constructed incorporating unchanged the modification found necessary to produce the desired correlation function.

While preferred embodiments of the invention have been described, it will be obvious to those skilled in the art that various changes and modifications may be made without departing from the spirit and scope of the invention.

What is claimed is:

1. In an autocorrelation receiving system in which two identical signals having a power spectrum $W_R(f)$ are autocorrelated, in which at least one parameter defining the position of a signal source is obtained from a time differential indicated by said autocorrelation, and in which the accuracy of said position parameter obtained is dependent upon the configuration of the autocorrelation function of said two signals, the method of improving the accuracy of determination of said position parameter comprising the steps of:

(a) selecting an autocorrelation function, the configuration of which permits greater accuracy of position parameter determination than does the autocorrelation function of said two signals;

(b) obtaining the power spectrum $W_O(f)$ by taking the inverse Fourier transform of the autocorrelation function selected in step (a);

(c) deriving a power weighting function $W_W(f)$ satisfying the relation $W_R(f)W_W(f)=W_O(f)$; and (d) weighting the power spectrum $W_R(f)$ of each of said signals in accordance with power weighting function $W_W(f)$ prior to autocorrelation of said signals.

2. The method of claim 1 in which the autocorrelation function selected in step $a$ has a main peak having a maximum corresponding to zero time displacement, and does not exceed a preselected level outside of said main peak.

3. In a cross-correlation receiving system in which two dissimilar signals with frequency spectra $G_R(f)$ and $G_T(f)$ are cross-correlated, in which at least one parameter defining the position of a signal source is obtained from a time differential indicated by said cross-correlation, and in which the accuracy of said position parameter obtained is dependent upon the configuration of the cross-correlation function of said two signals, the method of improving the accuracy of determination of said position parameter comprising the steps of:

(a) selecting a cross-correlation function, the configuration of which permits greater accuracy of position parameter determination than does the cross-correlation function of said two signals;

(b) obtaining the product spectrum $W_O(f)$ by taking the inverse Fourier transform of the cross-correlation function selected in step (a);

(c) determining the two frequency spectra $G_R'(f)$ and $G_T'(f)$ whose product produces product spectrum $W_O(f)$;

(d) deriving two frequency weighting functions $G_{WR}(f)$ and $G_{WT}(f)$ satisfying the relationships $$G_R(f)G_{WR}(f)=G_R'(f)$$

and $$G_T(f)G_{WR}(f)=G_T'(f)$$

and (e) weighting the frequency spectrum $G_R(f)$ of one of said signals in accordance with frequency weighting function $G_{WR}(f)$, and weighting the frequency spectrum $G_T(f)$ of the other of said signals in accordance with frequency weighting function $G_{WT}(f)$, both signals being weighted prior to correlation.

4. The mehod of claim 3 in which the cross-correlation function selected in step $a$ has a main peak having a maximum corresponding to zero time displacement, and does not exceed a preselected level outside of said main peak.

5. In an autocorrelation detecting system comprising:
at least two spaced receiving elements;
a correlator, said two receiving elements being connected to the inputs of said correlator;
whereby the time difference of arrival of a signal at said two receiving elements, and therefore the angular position of the source of said signal, may be determined by the autocorrelation of signals from said two receiving elements in said correlator, with the autocorrelation function of the received signal defining the system beam pattern;
the improvement comprising:
at least two filters, one corresponding to each said receiving elements and being placed between said receiving elements and said correlator, said filters having substantially identical power response characteristics $W_W(f)$ satisfying the equation $W_R(f)W_W(f)=W_O(f)$, where
$W_R(f)$ is the power spectrum of the received signal, and
$W_O(f)$ is a power spectrum comprising the inverse Fourier transform of a beam pattern having better directional characteristics than the beam pattern defined by the autocorrelation function of the received signal.

6. A steered beam autocorrelation detection system comprising:
at least two spaced receiving elements;
a plurality of correlators,
each of said correlators having two inputs and an output,
one of said receiving elements being connected to one input of each said correlator, the other of said receiving elements being connected to the other input of each said correlator;
whereby the time difference of arrival of a signal at said two receiving elements, and therefore the angular position of the source of said signal, may be determined from the autocorrelated output of each said correlator, with the autocorrelation function of the received signals defining the beam pattern corresponding to each correlator, with the beam patterns corresponding to all correlators being equal;
beam steering means comprising means for inserting a different amount of time delay between at least one of said receiving elements and its corresponding input to each of said correlators,
whereby simultaneous identical beam patterns exist at the output of each said correlator, with the angular positions of said beam patterns being displaced from each other by means of the differing amounts of time delay introduced;
beam pattern synthesizing means comprising means to modify the characteristics of said signal, prior to the inputs of said correlators, according to the weighting function $W_W(f)$, where $W_W(f)$ satisfies the equation $W_R(f)W_W(f)=W_O(f)$, and where
$W_R(f)$ is the power spectrum of the received signal, and
$W_O(f)$ is a power spectrum comprising the inverse Fourier transform of a beam pattern having better directional characteristics than the beam pattern defined by the autocorrelation function of the received signal.

7. A correlation ranging system comprising:
a transmitter adapted to transmit a signal having a frequency spectrum $G_T(f)$;
a receiver adapted to receive the reflection of said transmitted signal from a target, said received signal having a frequency spectrum $G_R(f)$;
a correlator having two inputs and an output;
the output of said receiver being connected to one input of said correlator;
means connecting said transmitter with the other input of said correlator and adapted to introduce a sample of said transmitted signal into said other correlator input;
whereby the reflected signal received by said receiver and a sample of said transmitted signal are correlated and the range of said reflecting target may be determined at said correlator output by the time displacement indicated by said correlation, and whereby the accuracy of range determination depends upon the configuration of the correlation function of said correlated signals;
means for synthesizing a correlation function by modifying the characteristics of said signals to be correlated prior to correlation, said means comprising:
means to modify said sample of said transmitted signal in accordance with frequency weighting function $G_{WT}(f)$, where $$G_T(f)(G_{WT}(f)=G_{T'}(f)$$

and
means to modify said signal from the output of said receiver in accordance with frequency weighting function $G_{WR}(f)$, where $$G_R(f)G_{WR}(f)=G_{R'}(f)$$

where $G_{T'}(f)$ and $G_{R'}(f)$ satisfy the equation $G_{T'}(f)G_{R'}(f)=W_O(f)$, $W_O(f)$ being the inverse Fourier transform of a correlation function permitting greater accuracy of range determination than the correlation function of said transmitted and received signals when unmodified.

References Cited

UNITED STATES PATENTS 2,941,202 6/1960 Harris et al.
3,060,426 10/1962 Williams _____ 343—112
3,068,474 12/1962 Higgins et al. _____ 343—113
3,130,408 4/1964 Kumano _____ 343—113
3,134,896 5/1964 Briggs.

RICHARD A. FARLEY, *Primary Examiner.*

KATHLEEN H. CLAFFY, CHESTER L. JUSTUS, RODNEY D. BENNETT, *Examiners.*

R. E. BERGER, *Assistant Examiner.*

UNITED STATES PATENT OFFICE
CERTIFICATE OF CORRECTION

Patent No. 3,346,862                                October 10, 1967

Ilmar G. Raudsep

It is hereby certified that error appears in the above numbered patent requiring correction and that the said Letters Patent should read as corrected below.

Column 2, line 45, for "pased" read -- passed --; column 3, lines 47 and 48, the formula should appear as shown below instead of as in the patent:

$$\tau = \frac{d}{\upsilon} \sin \theta$$

column 11, lines 35 and 36, the formula should appear as shown below instead of as in the patent:

$$G_T(f) G_{WT}(f) = G_T{'}(f)$$

same column 11, line 62, for "elements" read -- element --.

Signed and sealed this 19th day of November 1968.

(SEAL)
Attest:

EDWARD M. FLETCHER, JR.                       EDWARD J. BRENNER
Attesting Officer                              Commissioner of Patents